United States Patent [19]

Umetsu et al.

[11] Patent Number: 5,375,740
[45] Date of Patent: Dec. 27, 1994

[54] MANUAL DISPENSER FOR DISPENSING PREDETERMINED AMOUNTS OF VISCOUS MATERIAL THROUGH ACTUATION OF A TRIGGER

[75] Inventors: Naoshi Umetsu; Hayato Arai; Kunio Yamamoto; Shuzo Shiraki, all of Tokyo, Japan

[73] Assignee: Toppan Printing Co., Ltd., Tokyo, Japan

[21] Appl. No.: 958,119

[22] PCT Filed: Apr. 27, 1992

[86] PCT No.: PCT/JP92/00546
§ 371 Date: Feb. 19, 1993
§ 102(e) Date: Feb. 19, 1993

[87] PCT Pub. No.: WO92/19389
PCT Pub. Date: Nov. 12, 1992

[30] Foreign Application Priority Data

Apr. 26, 1991 [JP] Japan ................................ 3-45893
Apr. 26, 1991 [JP] Japan ................................ 3-45894

[51] Int. Cl.⁵ ............................................. B65D 35/28
[52] U.S. Cl. ........................................ 222/95; 222/327; 222/391
[58] Field of Search ............... 222/95, 105, 153, 183, 222/326, 327, 391, 214

[56] References Cited

U.S. PATENT DOCUMENTS

| 1,718,596 | 6/1929 | Smith ................................ 222/391 |
| 2,233,587 | 3/1941 | Crewe ............................... 222/391 |
| 3,288,333 | 11/1966 | Valk, Jr. ........................... 222/95 |
| 3,323,682 | 6/1967 | Creighton, Jr. et al. .......... 222/327 |
| 3,687,339 | 8/1972 | Dessureault ..................... 222/326 |
| 5,156,305 | 10/1992 | Eyre .................................. 222/327 |

FOREIGN PATENT DOCUMENTS

| 51-115718 | 9/1976 | Japan . |
| 53-54339 | 12/1978 | Japan . |
| 54-30205 | 9/1979 | Japan . |
| 58-112476 | 8/1983 | Japan . |
| 64-1270 | 1/1989 | Japan . |
| 3-105486 | 10/1991 | Japan . |

Primary Examiner—Andres Kashnikow
Assistant Examiner—Philippe Dergkshani
Attorney, Agent, or Firm—Burns, Doane, Swecker & Mathis

[57] ABSTRACT

A dispenser serves to inject an edible viscous material such as mayonnaise, cream or the like at a constant rate after it is once contained in a cartridge (26). The dispenser includes a storing portion (2) in which a cylindrical inner case (30) having a bottom is stored. The cylindrical inner case (30) is dimensioned to have a length long enough so as to allow a shoulder portion of the cartridge (26) to be exposed to the outside via an opening portion at one end thereof. An insert hole (31) is formed on the bottom of the cylindrical inner case (20) at the other end of the latter so as to enable a rod (22) to be inserted therethrough. The cartridge (26) and an extrusion plate (21) are received in the cylindrical inner case (30) so that the extrusion plate (21) can smoothly be displaced in the storing portion (2). A pawl member (8) disposed in a trigger (4) and a stopper (15) disposed in a main body (1) of the dispenser are brought in meshing engagement with a gear wheel assembly (10) mounted on a support shaft (5) for the trigger (4) in the coaxial relationship. In addition, a rod (22) adapted to be reciprocably displaced in the storing portion (2) is brought in meshing engagement with the gear wheel assembly (10). A guide (19) adapted to be displaced slidably relative to the pawl member (8) is disposed on the main body (1) side in such a manner that it is disengaged from the gear wheel assembly (10) when the trigger (4) is restored to the original position.

7 Claims, 7 Drawing Sheets

MANUAL DISPENSER FOR DISPENSING PREDETERMINED AMOUNTS OF VISCOUS MATERIAL THROUGH ACTUATION OF A TRIGGER

TECHNICAL FIELD

The present invention relates to a dispenser for injecting a viscous material, especially, an edible viscous material such as mayonnaise, cream or the like at a constant rate after it is once stored in the dispenser.

BACKGROUND ART

A dispenser for injecting a certain material such as a caulking agent or the like by actuating a trigger to squeeze a storing portion after it is once stored in the storing portion, in order to fill gaps or cracks arising inside/outside of a building with the foregoing material has been hitherto used (refer to an official gazette of, e.g., Japanese Patent Laid-Open Publication NO. 51-115718).

Trials have been made for practically employing a dispenser of the foregoing type as a cooking instrument for the purpose of injecting an edible viscous material such as mayonnaise, cream or the like. In recent years, especially, when mayonnaise is distributed over a number of dishes each having salad or the like placed thereon in a restaurant or the like, a dispenser including a cartridge molded of a thin sheet of synthetic resin by employing a blow molding process in consideration of easy exchanging of the present viscous material with other type of viscous material is increasingly employed as a cooking instrument. This type of dispenser is practically used by squeezing the cartridge with an operator's hand after the cartridge is once filled with the viscous material.

However, with respect to the cartridge having a small thickness as mentioned above, when the inner diameter of a storing portion for holding the cartridge is dimensioned to be equal to the outer diameter of an extrusion plate, there arise malfunctions that a bottom of the cartridge is infolded between the extrusion plate and the inner wall surface of the storing portion, resulting in the extrusion plate failing to be displaced further in the forward direction, and moreover, a part of the viscous material remains in the infolded Dart of the cartridge, resulting in the viscous material failing to be completely injected from the cartridge.

Even in case that no infolding occurs with the cartridge, it is observed that the outer peripheral surface of the cartridge comes in close contact with the inner wall surface of the storing portion with the result that the extrusion plate is hardly displaced in the squeezing direction.

To solve these problems, a proposal has been made with respect to a dispenser as disclosed in an official gazette of, e.g., Japanese Utility model Publication NO. 64-1270 wherein a container having a viscous material contained therein is received in an outer bag adapted to be slidably displaced so that the container can smoothly be compressed via the outer bag. However, this proposal is not practically employed due to an expensive cost because the container is produced by way of complicated steps, and moreover, it is a disposable container.

In addition, it is undesirably necessary from the viewpoint of structure that the dispenser is actuated with a large magnitude of actuating force. Since a viscous material contained in the container is not injected at a constant rate, there arises another malfunction that the viscous material can not exactly be injected through an injecting hole at a constant rate with the dispenser. Further, there appear problems that the injected viscous material is not sharply cut off from the container, and a part of the viscous material remains still in the vicinity of an injection port or the injection port is unsanitarily clogged with the remaining viscous material.

The present invention has been made in consideration of the foregoing background and its object resides in providing a dispenser for injecting a viscous material wherein an extrusion plate is smoothly displaced without incorrect operation of the dispenser due to infolding of a cartridge, and moreover, the dispenser can easily be handled with an operator's hand.

Here, a purport of the present invention consists in a dispenser employable as a cooking instrument. However, due to the fact that the foregoing type of dispenser is originally designed for industrial use, components other than a cartridge are made of a metallic material in view of durability and other subjects. Thus, the dispenser itself becomes heavy, resulting in the dispenser being handled with difficulty. In addition, since part of a thrusting portion (rod) is exposed to the outside, when the dispenser is employed as a cooking instrument in a restaurant or the like in which an ample amount of water is consumed in a cooking shop, the components readily rust, causing an unsanitary problem to appear.

To solve this problem, a common applicant to the present invention proposed a manual type dispenser for injecting a viscous material wherein the viscous material contained in a storing portion is extruded by actuating a trigger disposed in a main body as disclosed in Japanese Utility Model Application NO. 2-60866 (Japanese Patent Laid-Open Publication NO. 3-105486). This proposed manual type dispenser includes as essential components a gear wheel assembly mounted on a support shaft for a trigger in the coaxial relationship, a pawl member disposed on the trigger to be brought in and out of meshing engagement with the gear wheel assembly, a resilient member for thrusting the pawl member in the direction of meshing engagement with the gear wheel assembly, a rod meshing with the gear wheel assembly so as to be reciprocably displaced in a storing portion having an injection hole formed at the foremost end thereof, a stopper disposed in the main body so as to allow it to be brought in and out of meshing engagement with the gear wheel assembly, and a resilient member for thrusting the stopper in the direction of meshing engagement with the gear wheel assembly.

With respect to the proposed manual type dispenser, however, many requests have been raised from users so as to enable the rod to be easily retracted when the viscous material is supplemented with a new viscous material or exchanged with other kind of viscous material after completion of an injecting operation performed for the viscous material.

In view of these requests, another object of the present invention is to provide a dispenser for injecting a viscous material wherein the dispenser is constructed based on the previously proposed dispenser in order to assure that after the trigger is released from the actuated state, the pawl member is reliably disengaged from the gear wheel assembly and wherein the aforementioned problems are completely eliminated and practical convenience of the dispenser is substantially improved.

DISCLOSURE OF THE INVENTION

According to one aspect of the present invention, the dispenser for injecting a viscous material is constructed such that as a trigger is actuated with an operator's hand, thrust force is transmitted to an extrusion plate which in turn is displaced in the forward direction to inject the viscous material from a cartridge at a constant rate. A cylindrical inner case is arranged between the outer peripheral surface of the cartridge and the inner wall surface of a storing portion in order to prevent the outer peripheral surface of the cartridge from adhering to the inner wall surface of the storing portion. The arrangement of the cylindrical inner case makes it possible that the extrusion plate is smoothly displaced and the viscous material is continuously and exactly injected at a constant rate without any necessity for a large magnitude of squeezing force.

A shoulder portion of the cartridge located on the opening portion side is exposed to the outside via an open end of the cylindrical inner case. When the viscous material is injected through an injection hole with the aid of the extrusion plate, the opening portion side of the cartridge is slightly contracted. On the contrary, when the trigger is released from the actuated state and the extruding force given by the extrusion plate disappears, the opening portion side of the cartridge is slightly elongated, causing the extrusion plate to be slightly retracted together with the cylindrical inner case (inducing so-called back suction after the trigger is released from the actuated state). The slight retraction of the extrusion plate permits the viscous material remaining on the cartridge opening portion side to be returned with the result that the viscous material in the opening portion of the cartridge is reliably cut off from the injected one without an occurrence of malfunction of dripping of the viscous material from the injecting hole, while preventing the viscous material from remaining in the vicinity of the injection hole.

When the viscous material is exchanged with other kind of viscous material, the present cartridge is exchanged with another cartridge having other kind of viscous material contained therein together with another cylindrical inner case. Consequently, the present invention has provided a dispenser for injecting a viscous material wherein an exchanging operation can easily be performed and the dispenser can very easily handled with an operator's hand.

According to another aspect of the present invention, the dispenser for injecting a viscous material is constructed such that when the trigger is actuated with an operator's hand, the pawl member disposed on the trigger is brought in meshing engagement with the gear wheel assembly which in turn transmits a thrusting force to the rod. While the rod is brought in meshing engagement with the gear wheel assembly, it is displaced in the forward direction so that the viscous material contained in the storing portion is extruded with the aid of the extrusion plate disposed at the foremost end of the rod. Thus, the viscous material is injected through the injection hole. At this time, the stopper is ready to be disengaged from the gear wheel assembly against the resilient force of a resilient member, whereby rotation of the gear wheel assembly is not obstructed by any means.

With the dispenser constructed in accordance with the present invention for injecting a viscous material, since the gear wheel assembly is employed as means for transmitting the force given by the actuator to the rod, a quantity of displacement of the rod is kept constant every time the trigger is actuated, compared with a conventional type of dispenser wherein a rod is displaced directly by a trigger. Thus, it is possible to continuously and exactly inject the viscous material through the injection hole without any necessity for a large magnitude of force. After the trigger is released from the actuated state, the rod is slightly retracted directly before the stopper stops rotation of the gear wheel assembly so that the viscous material remaining in the vicinity of the injection hole is slightly retracted in the storing portion. Consequently, the viscous material in the storing portion is sharply cut off from the injected viscous material while preventing the viscous material from remaining in the vicinity of the injection hole.

The gear wheel assembly is composed of two gear wheel. This prevents the load derived from the pawl member, the stopper and the rod from being concentrated on one of the gear wheels, resulting in strength and durability of the dispenser being improved further. Even when one gear meshing with the rod is dimensioned to have a small diameter, a sufficiently high rotational torque can be generated by dimensioning the other gear to have a large diameter. When the trigger is released from the actuated state, the stopper is disengaged from the gear wheel assembly with the aid of a guide. At this time, the rod can be retracted by disengaging only the stopper from the gear wheel assembly. Thus, handling of the dispenser such as refilling of a new viscous material and replacing of the present viscous material with other kind of tack material can be achieved very easily.

BEST MODE FOR CARRYING OUT THE INVENTION

Next, the present invention will be described in detail hereinafter with reference to the accompanying drawings which illustrate preferred embodiments thereof. FIG. 1 to FIG. 4 show an embodiment of a dispenser for injecting a viscous material wherein the dispenser is in accordance with a first aspect of the present invention. In the drawings, reference numeral 1 designates a main body and reference 2 designates a storing portion. Each of the main body 1 and the storing portion 2 is molded of a synthetic resin. Especially, the storing portion 2 is molded of a transparent synthetic resin. It should be added that the storing portion 2 is removably attached to the main body 1. The main body 1 includes a grip portion 3 in which a trigger 4 is turnably received to turn about a support shaft 5. A coil spring 6 is disposed at the rear central part of the trigger 4 with its rear end held on the inner wall surface of the grip portion 3, whereby the trigger 4 is normally biased by the action of the restorative resilient force of the coil spring 6 so as to be restored to its original position.

Figure 1:
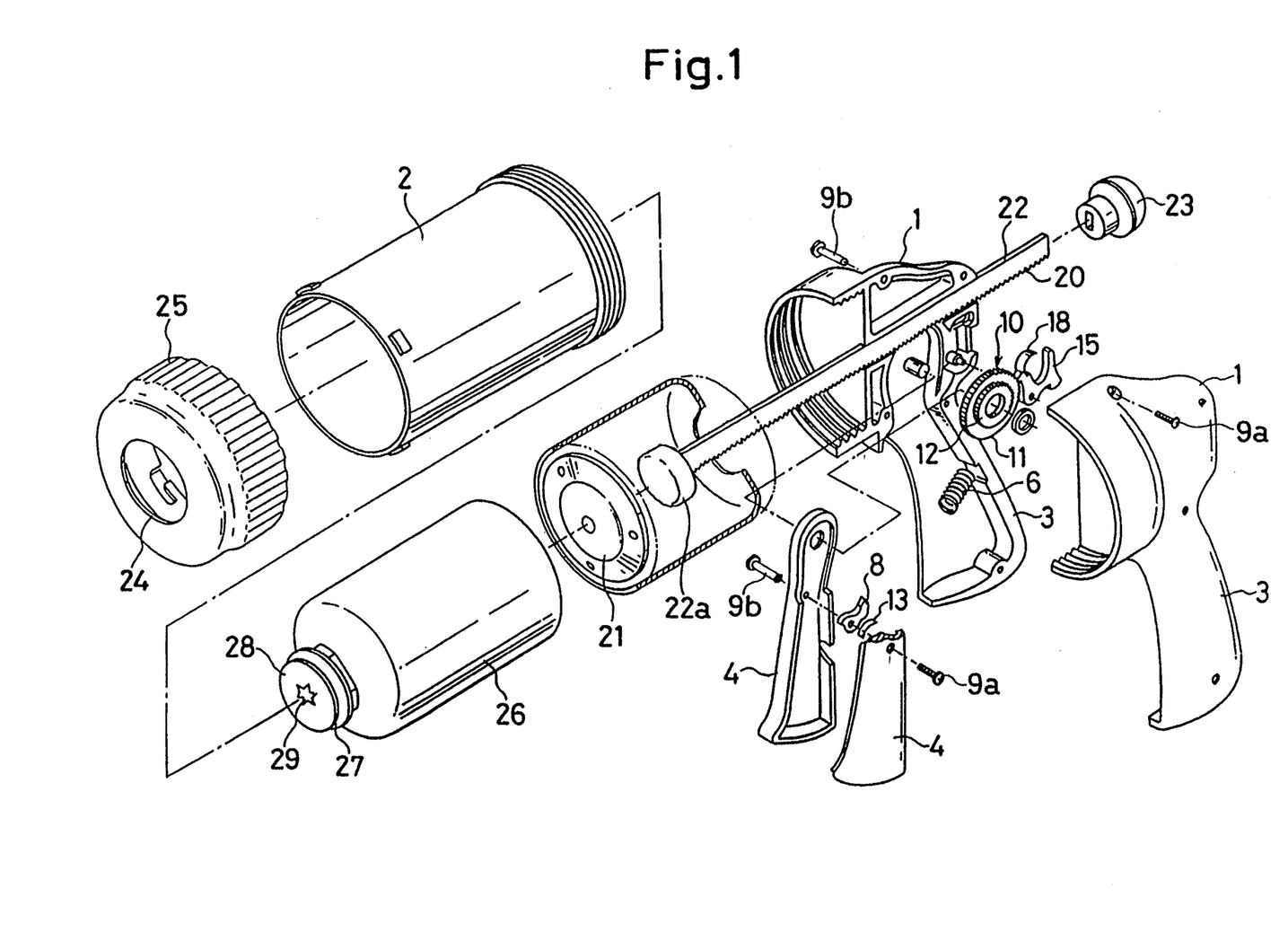
FIG. 1 is an illustrative view which shows an embodiment of a dispenser for a viscous material constructed in accordance with a first aspect of the present invention wherein the dispenser is shown in the disassembled state.

On the other hand, a pawl member 8 having a projection 7 formed at the rear end thereof is disposed in the trigger 4 to turn about a support shaft 9 within the range of a predetermined angle, and a gear wheel assembly 10 is arranged in operative association with the pawl member 8 to rotate about the support shaft 5. As is best seen in FIG. 1, the support shaft 9 is composed of a male-threaded part 9a and a female-threaded part 9b, and the male-threaded portion 9a is threadably engaged with the female-threaded part 9b including a short tube portion. Thus, the trigger 4 is reliably assembled by the threadable engagement of the male-threaded part 9a with the female-threaded part 9b without any occurrence of loosening. Such fixing means each comprising a pair of male-threaded part and a female-threaded part as mentioned above are utilized at various locations in the main body 1 to assemble the latter with excellent durability without any occurrence of a malfunction that the main body 1 is disassembled even when the dispenser is carelessly handled.

Figure 2:
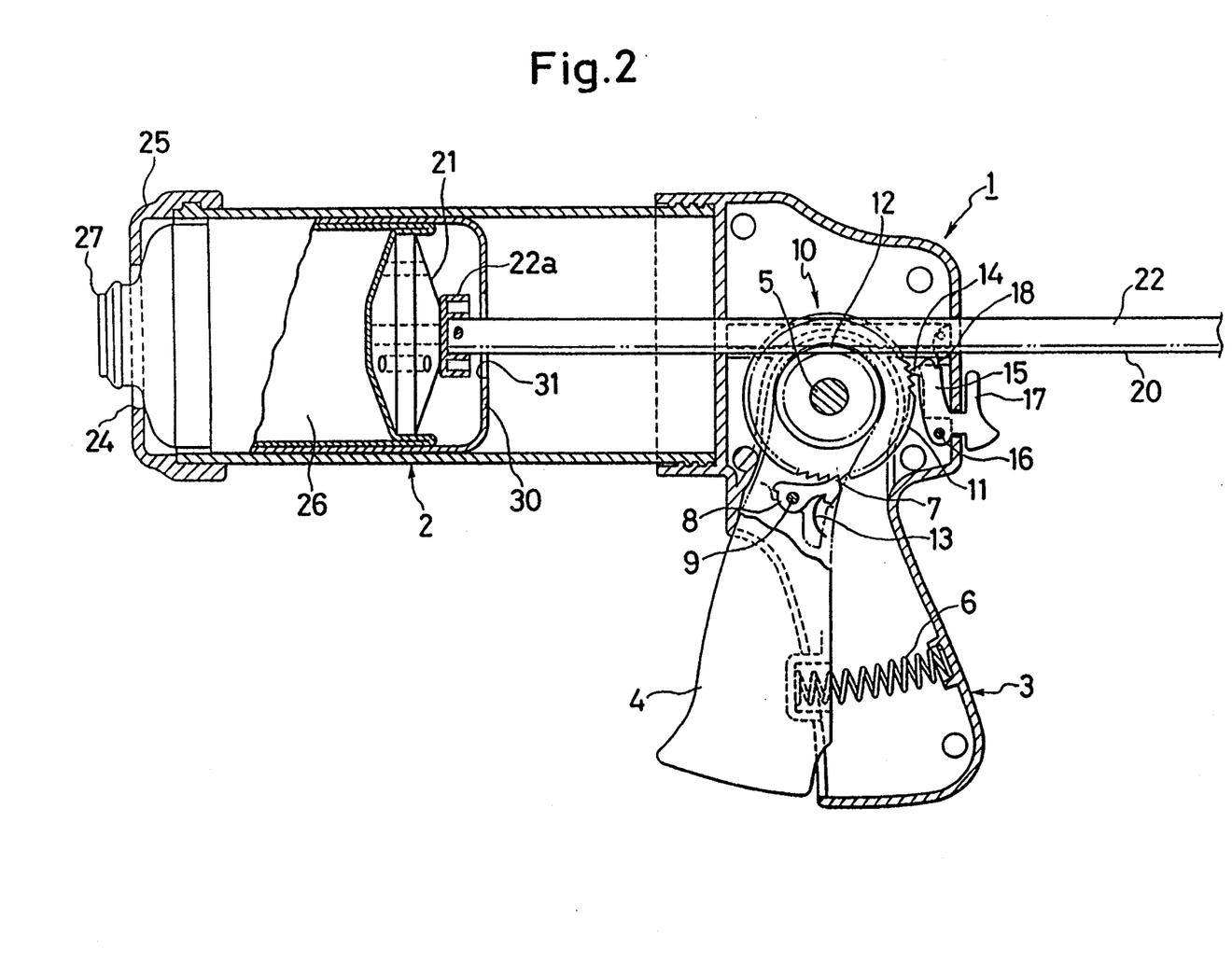
FIG. 2 is an illustrative view which shows by way of a sectional view the embodiment of the dispenser constructed in accordance with the first aspect of the present invention.

The gear wheel assembly 10 is constructed of a first gear wheel 11 having a large diameter and a second gear wheel 12 having a small diameter both of which are mounted on the support shaft 5 in the coaxial relationship. Referring to FIG. 2, it is assumed that the clockwise direction is hereinafter referred to as a normal direction and the anticlockwise direction is hereinafter referred to as a reverse direction. With this construction, a force effective in the reverse direction is exert on the pawl member 8 by the action of a resilient member, i.e., a leaf spring 13 so as to allow the pawl member 8 to turn about the support shaft 9 in the reverse direction, whereby the projection 7 is thrusted to the first gear wheel 11 to mesh with the latter.

A stopper 15 having a projection 14 formed at its fore end is disposed at the rear end part of the main body 1 so as to turn about a support shaft 16 within the range of a predetermined angle. The stopper 15 includes an actuating portion 17 which is projected outside of the main body 1. A force effective in the reverse direction is exerted on the stopper 15 by a resilient member, i.e., a leaf spring 18 so as to allow the projection 14 to mesh with the first gear wheel 11.

Since the pawl member 8 and the stopper 18 mesh with the first gear wheel 11 in the above-described manner, the power given by the trigger 4 is transmitted to the first gear wheel 11 via the pawl member 8 (i.e., the first gear wheel 11 is rotated in the reverse direction), and when the trigger 4 is restored to the original position, the stopper 15 serves to prevent the first gear wheel 11 from being rotated in the reverse direction.

In addition, the main body 1 includes a rack 20 meshing with the second gear wheel 12, and a rod 22 integrated with the rack 20 and having an extrusion plate 21 secured to the foremost end thereof is reciprocably arranged in the storing portion 2. A gripping portion 23 is disposed at the rear end of the rod 22 on the opposite side relative to the extrusion plate 21. A cover member 25 having an injection port 24 formed therethrough is attached to the storing portion 2.

A cartridge 26 to be stored in the storing portion 2 is prepared in the form of a bag made of a soft film material or the like. Otherwise, the cartridge 26 is prepared in the form of a cylinder molded of a synthetic resin by employing a blow molding process. A sealing member 28 made of a material, e.g., aluminum or the like is adhesively secured to an opening portion 27 of the cartridge 26, and an injection hole 29 is formed through the sealing member 28 so as to inject a viscous material contained in the cartridge 26 therethrough (see FIG. 1).

The foremost end of the rod 22 can removably be attached to the rear surface of the extrusion plate 21. Alternatively, the foremost end of the rod 22 may be brought merely in contact with the extrusion plate 21 via a boss 22a, as shown in FIG. 1 and FIG. 2. In such manner, the extrusion plate 21 can simply be fitted to the rod 22 without any particular directionality of injection of the viscous material therefrom by designing the extrusion plate 21 with a common configuration not only on the front side but also on the rear side.

The cartridge 26 and the extrusion plate 21 are stored in the storing portion 2 together with a cylindrical inner case 30 having a bottom in such a state that they are received in the cylindrical inner case 30 as shown in FIG. 2. The cylindrical inner case 30 is designed to have a length long enough so as to allow a shoulder portion of the cartridge 26 to be exposed to the outside via an opening portion thereof while the cartridge 26 and the extrusion plate 21 are received in the cylindrical inner case 30. In addition, an insert hole 31 is formed through the bottom of the cylindrical inner case 30 so that the rod 22 extends through the insert hole 31.

A dimensional difference between an outer diameter of the cartridge 26 and an outer diameter of the extrusion plate 21 is determined to be as large as four times or more of the thickness of the cartridge 26. As the bottom of the cartridge 26 is thrusted by the extrusion plate 21 while the cartridge 26 is received in the cylindrical inner case 30, the bottom side of the cartridge 26 is increasingly infolded between the outer surface of the extrusion plate 21 and the inner surface of the cylindrical inner case 30 without any occurrence of a malfunction that displacement of the extrusion plate 21 is obstructed.

The cartridge 26 is arranged such that it is received together with the extrusion plate 21 in the cylindrical inner case 30. Thus, when the viscous material contained in the cartridge 26 is exchanged with other kind of viscous material, the cartridge 26 is exchanged with another one having the last-mentioned viscous material contained therein.

Next, a mode of operation of the dispenser for injecting a viscous material wherein the dispenser is constructed in the aforementioned manner in accordance with the first aspect of the present invention will be described below.

When the grip portion 3 is first gripped with an operator's hand and the trigger 4 is then actuated with his fingers, the pawl member 8 is rotated in the reverse direction with the support shaft 9 as a center, causing the first gear wheel 11 to be rotated in the reverse direction.

In such manner, the actuation of the trigger 4 is transmitted to the gear wheel assembly 10 via the pawl member 8 in the form of rotational movement which in turn is transmitted to the rack 20 to displace the rod 22 in the forward direction. At this time, the stopper 15 meshes with the first gear wheel 11 by the action of the force effective in the direction toward the gear wheel assembly 10. However, since the stopper 15 is rotated with the support shaft 16 as a center in the normal direction against the resilient force of the leaf spring 18 (i.e., in such a direction that the projection 14 is parted away from the gear wheel assembly 10), there is no possibility that rotation of the gear wheel assembly 10 is obstructed.

As the rod 22 is displaced in the forward direction, the extrusion plate 21 thrusts the cartridge 26 so that the viscous material contained in the cartridge 26 is injected through the injection hole 29.

Next, when the trigger 4 is released from the actuated state, it is restored to the original position under the effect of the resilient force of the coil spring 6. At this time, due to the fact that the stopper 15 is thrusted by the leaf spring 18, after the gear wheel assembly 10 is slightly rotated in the normal direction, the rotation of the gear wheel assembly 10 is stopped. In other words, the stopper 15 is brought out of meshing engagement with the first gear wheel 11.

Figure 3:
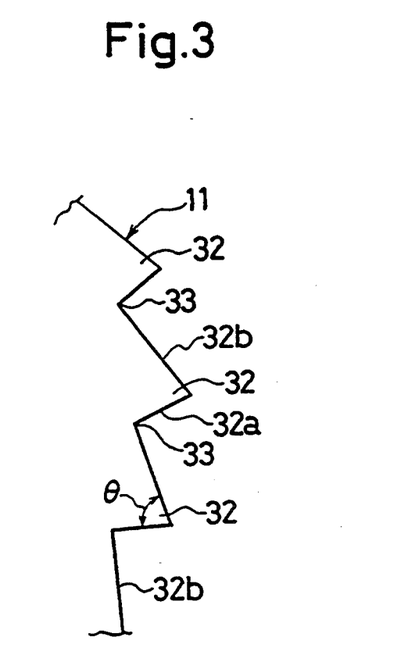
FIG. 3 is an illustrative view which shows a first gear wheel for the embodiment of the dispenser constructed in accordance with the first aspect of the present invention.

As shown in FIG. 3, the first gear wheel 11 is generated in the form of a ratchet wheel including a number of gear tooth portions 32 each of which is composed of a steeply inclined face 32a slantwise extending in the normal direction (i.e., inclined face located on the side which is operatively effective in such a direction that the rod 22 is displaced in the rearward direction) and a gently inclined face 32b slantwise extending in the reverse direction (i.e., inclined face located on the side which operatively effective in such a direction that the rod 22 is displaced in the forward direction). For example, an angle $\theta$ defined by the inclined face 32a and the inclined face 32b of each gear tooth portion 32 is set to about 50° to 70°. When the gear wheel assembly 10 is not rotationally driven in the reverse direction any more, the stopper 15 is brought in meshing engagement with one of the gear tooth portions 32, causing the inclined face 32b that is a gently inclined face to come in slidable contact with the projection 14 of the stopper 15, whereby the first gear wheel 11 is rotated in the normal direction as mentioned above until the inclined face 32b reaches a gear tooth bottom 33.

The rotation of the gear wheel assembly 10 in the normal direction (i.e., rotation of the second gear wheel 12 in the normal direction) permits the rod 22 to be slightly retracted, resulting in a part of the viscous material remaining in the vicinity of the injection hole 29 being returned in the cartridge 26. Thereafter, however, the rod 22 is not retracted any more. As is apparent from the above description, since the gear wheel assembly 10 is always rotated by a constant angle every time the trigger 4 is actuated with the operator's hand, a predetermined quantity of viscous material contained in the cartridge 26 can be injected through the injection hole 29 by repeatedly actuating the trigger 4.

Figure 4:
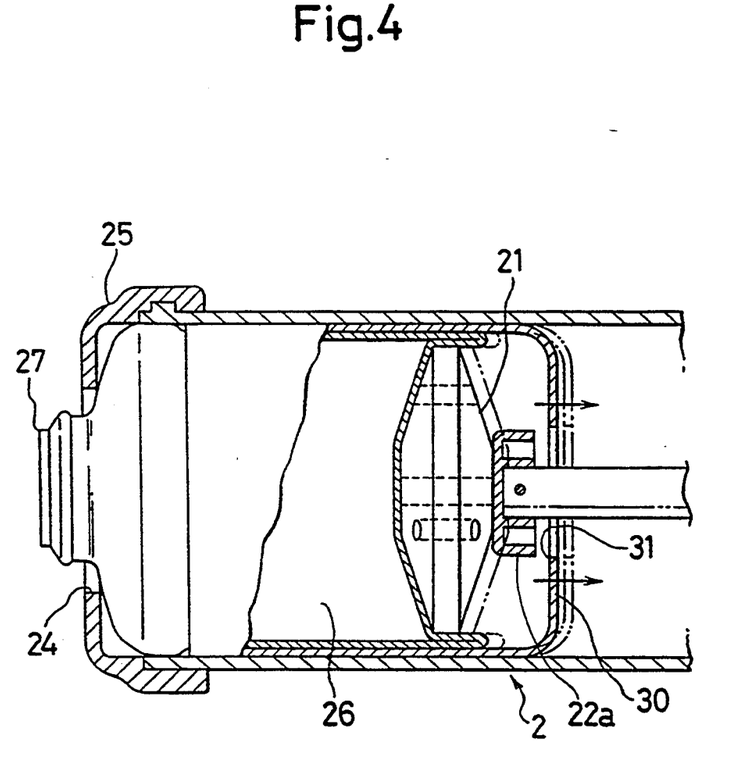
FIG. 4 is an illustrative view which shows a storing portion for the embodiment of the dispenser constructed in accordance with the first aspect of the present invention.

When the gear wheel assembly 10 is rotated in the normal direction after the trigger 4 is released from the actuated state, the rod 22 is slightly retracted in the above-described manner while inducing so-called back suction. Specifically, as the extrusion plate 21 is displaced in the forward direction, the viscous material contained in the cartridge 26 is injected through the injection hole 29, causing a part of the viscous material remaining on the opening portion 27 of the cartridge 26 side to be slightly contracted. Subsequently, when the extrusion plate 21 is retracted after the trigger 4 is released from the actuated state, the foregoing part of the viscous material remaining on the opening portion 27 side of the cartridge 26 returns in the cartridge 26. Not only due to the fact that the rod 22 is retracted when the trigger 4 is released from the actuated state but also due to the fact that the cartridge 26 does not contact the storing portion 2 as shown in FIG. 4, the extrusion plate 21 and the cylindrical inner case 30 are smoothly retracted together with the rear part of the cartridge 26, resulting in the viscous material being drawn from the opening portion 27 of the cartridge 26 with sharp cutting-off of the viscous material from the injected viscous material.

Next, a procedure of refilling the cartridge 26 with a new viscous material and exchanging the present viscous material with another one will be described below.

When injection of the viscous material in the cartridge 26 is completed by displacement of the rod 22 to the foremost position, the actuating portion 17 of the stopper 15 is actuated with an operator's finger to disengage the stopper 15 from the gear wheel assembly 10, and subsequently, the rod 22 is restored to the original position. Now, the cartridge 26 can be exchanged with another cartridge containing other kind of viscous material, together with another cylindrical inner case. This is because the gear wheel assembly 10 is brought in the freely rotatable state when the stopper 15 is disengaged from the gear wheel assembly 10.

Injection of the viscous material in the cartridge 26 can satisfactorily be achieved merely by keeping the injection hole 29 open. To assure that injection of the viscous material is more completely achieved, it is recommendable that an injection nozzle is additionally attached to the injection hole 29. When the present cartridge is exchanged with a new one after completion of each injecting operation, it is first taken out from the storing portion together with the cylindrical inner case. Subsequently, the new cartridge and the extrusion plate are inserted into the cylindrical inner case, and an assembly of the new cartridge, the extrusion plate and the cylindrical inner case is then stored in the storing portion, whereby an exchanging operation is completed.

Figure 5:
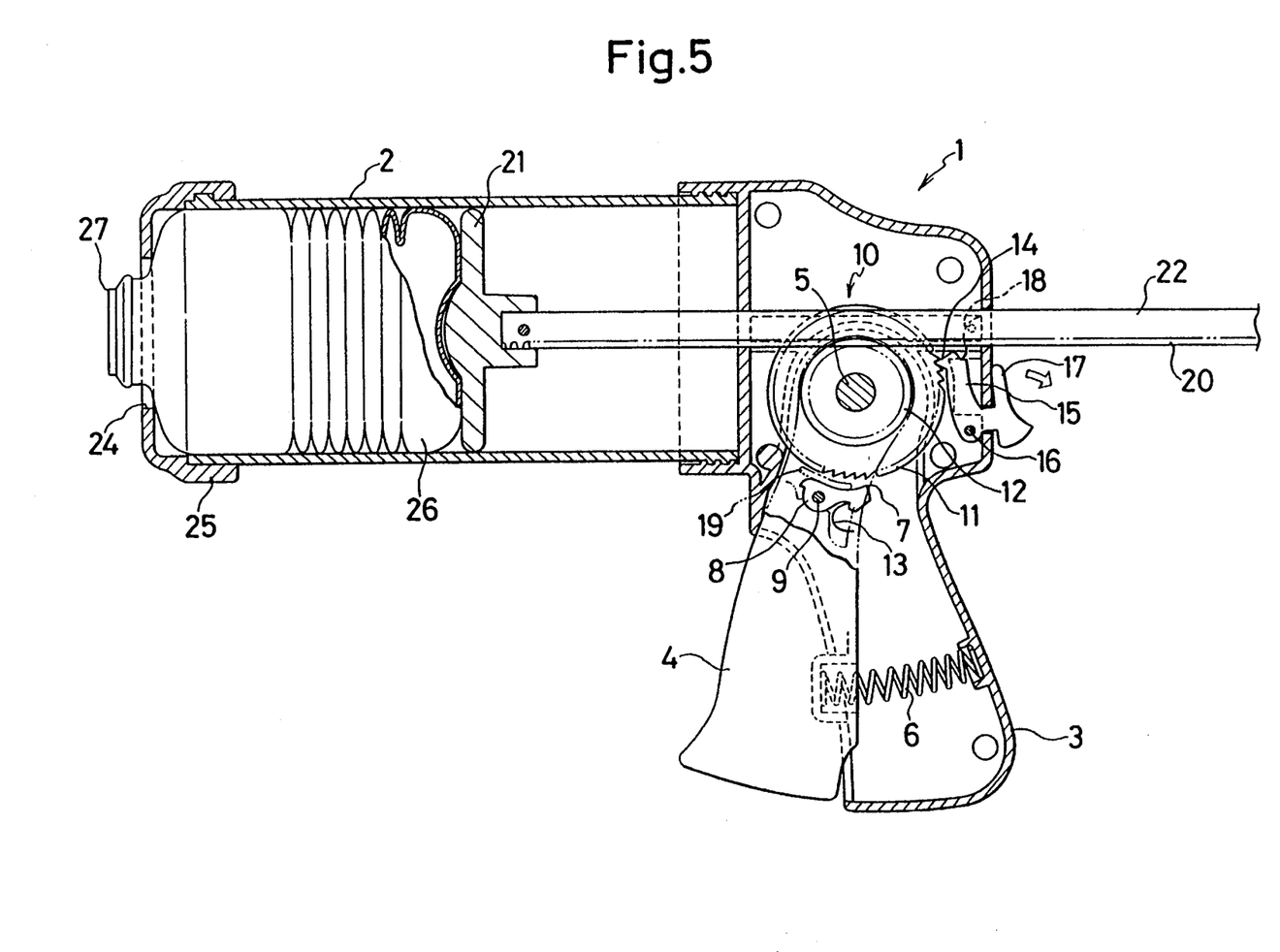
FIG. 5 is an illustrative view which shows an embodiment of a dispenser for a viscous material constructed in accordance with a second aspect of the present invention.
Figure 6:
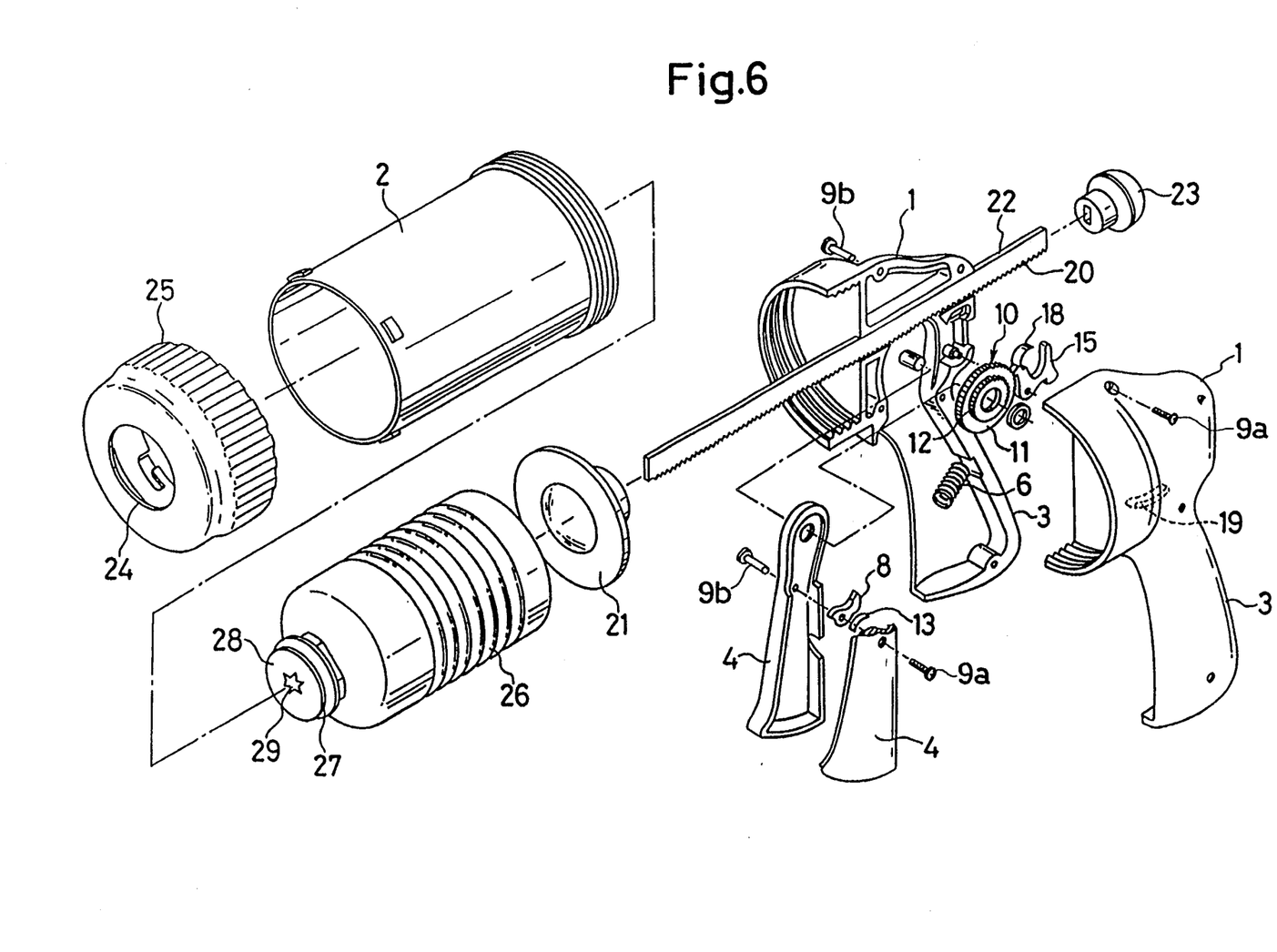
FIG. 6 is an illustrative view which shows the embodiment of the dispenser constructed in accordance with a second aspect of the present invention wherein the dispenser is shown in the disassembled state.

FIG. 5 to FIG. 8 show a dispenser for injecting a viscous material wherein the dispenser is constructed in accordance with a second aspect of the present invention such that a bellows corrugated type cartridge is employed for the cartridge. FIG. 5 is a sectional view which shows an embodiment of the dispenser constructed in accordance with the second aspect of the present invention. As is apparent from the drawing, the fundamental structure of a main body 1 is similar to the dispenser constructed in accordance with the first aspect of the present invention.

Figure 7:
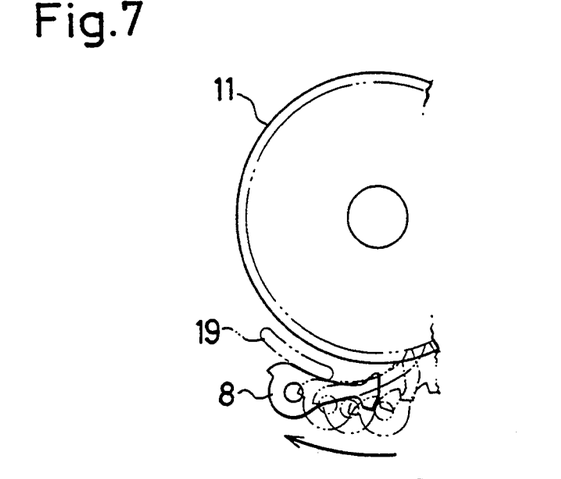
FIG. 7 is an illustrative view which shows by way of displacement of a pawl member the embodiment of the dispenser constructed in accordance with the second aspect of the present invention.
Figure 8:
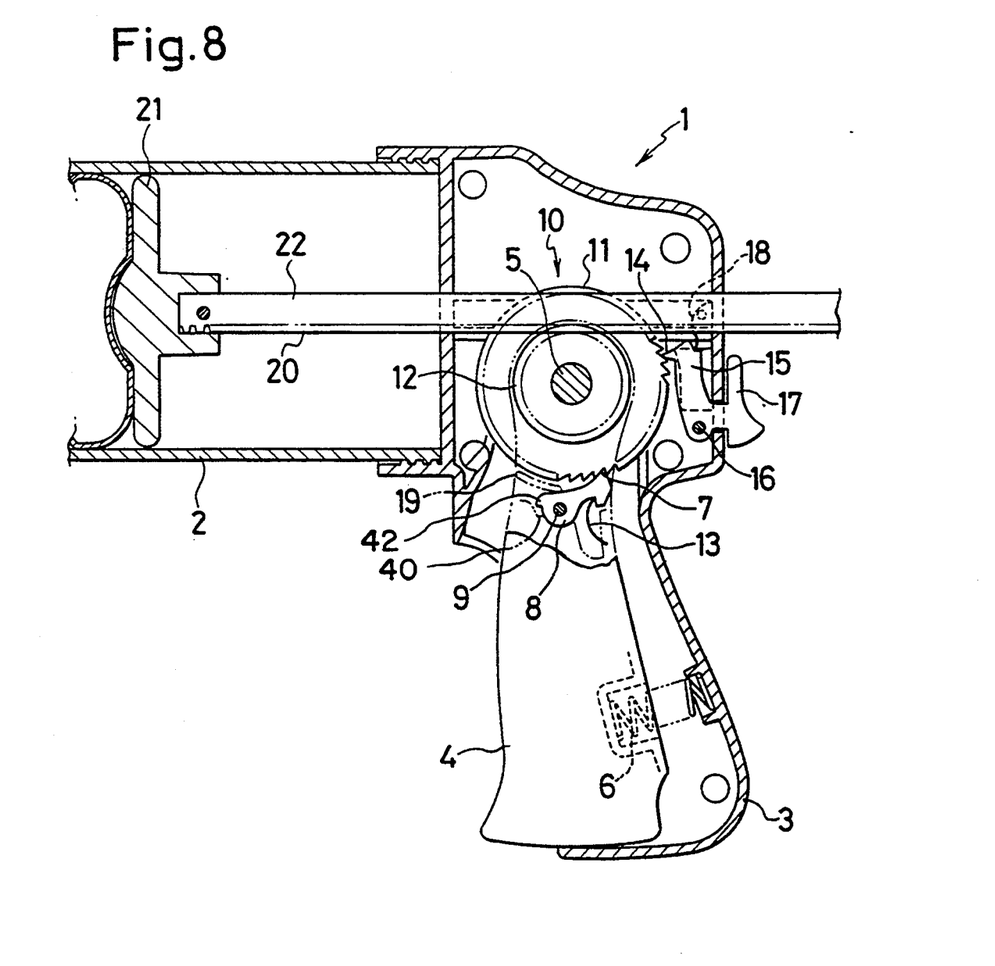
FIG. 8 is an illustrative view which shows the embodiment of the dispenser constructed in accordance with the second embodiment of the present invention wherein a trigger is shown in the actuated state.

According to the second aspect of the present invention, a main body 1 includes a guide 19 which is located between a first gear wheel 11 and a displacement line of a pawl member 8. A guide 19 is projected to one half side (located on the fore side as seen in FIG. 5 but not shown in the drawing) of a grip portion 3 so as to restrict turnable movement of the pawl member 8. As is best seen in FIG. 7, the guide 19 comes in slidable contact with the upper surface of the pawl member 8 which turnably moves as a trigger 4 is displaced (in the arrow-marked direction in FIG. 4) in the course of return movement of the trigger 4 after the latter is released from the actuated state, whereby the guide 19 serves to turn the pawl member 8 until the latter is disengaged from the first gear wheel 11. Thereafter, when the trigger 4 is restored to the original position, the pawl member 8 is completely parted away from the first gear wheel 11 (while the first gear wheel 11 is engaged with a stopper 15).

A cartridge 26 stored in a storing portion 2 is prepared in the form of a bag molded of a soft film or the like or in the form of a cylindrical member of which part is corrugated by employing a blow molding process using a synthetic resin.

Next, a mode of operation of the dispenser for injecting a viscous material wherein the dispenser is constructed in the aforementioned manner in accordance with the second aspect of the present invention will be described below.

A grip portion 3 is first gripped with an operator's hand and the trigger 4 is then actuated by his fingers. The trigger 4 is turnably displaced together with the pawl member 8 against the resilient force of a coil spring 6. At this time, due to the fact that the pawl member 8 is thrusted toward the gear wheel assembly 10 side by the action of a resilient member, i.e., a leaf spring 13, as the pawl member 8 is parted away from the guide 19, it is turnably displaced toward the first gear wheel 11 side until a projection 7 of the pawl member 8 meshes with the gear wheel assembly 10 (see FIG. 8).

As the trigger 4 is actuated with operator fingers, the pawl member 8 is rotated with a support shaft 9 as a center in the reverse direction to mesh with the first gear wheel 11 which in turn is rotated in the reverse direction. At this time, a projection 42 of the pawl member 8 is engaged with an engagement portion 40 of the trigger 4 to firmly hold the pawl member 8 in such a manner as to prevent it from being rotated in excess of a predetermined angle.

The actuation of the trigger 4 is transmitted to the gear wheel assembly 10 via the pawl member 8 in the form of rotational movement which in turn is transmitted to a rack 20 to displace a rod 22 in the forward direction in the same manner as the preceding embodiment. At this time, a stopper 15 is brought in meshing engagement with the first gear wheel 11 under the effect of the force given by a resilient member, i.e., a leaf spring 18 in the direction toward the gear wheel assembly 10. However, at this time, since the stopper 15 can be rotated against the resilient force of the leaf spring 18 with a support shaft 16 as a center in the normal direction (i.e., in such a direction that a projection 14 of the stopper 15 is parted away from the gear wheel assembly 10), there is no possibility that rotation of the gear wheel assembly 10 is obstructed. As the rod 22 is displaced in the forward direction, a viscous material contained in a cartridge 26 is injected through an injection hole 29 by the forward movement of an extrusion plate 21.

Next, when the trigger 4 is released from the actuated state, it is restored to the original position by the resilient force of a coil spring 6 as shown in FIG. 5. At this time, since the stopper 15 is thrusted by the leaf spring 18, the gear wheel assembly 10 is slightly rotated in the normal direction, and thereafter, the rotation of the gear wheel assembly 10 is stopped. In other words, the stopper 15 is brought in meshing engagement with the first gear wheel 11.

The first gear wheel 11 is generated in the form a ratchet wheel including a number of gear tooth portions 32 each of which is composed of a steeply inclined face 32a located on the normal direction side and a gently inclined face 32b located on the reverse direction side in the same manner as the foregoing embodiment (see FIG. 3). When the gear wheel assembly 10 is not rotationally driven in the reverse direction any more, the stopper 15 thrusts one of the gear tooth portions 32, and the inclined face 32b that is a gently inclined face comes in slidable contact with the projection 14 of the stopper, whereby the first gear wheel 11 is rotated in the normal direction until the projection 14 reaches a gear tooth bottom 33.

As a second gear wheel 12 is rotated in the normal direction, the rod 22 is slightly retracted, causing the viscous material remaining in the vicinity of the injection hole 29 to be returned to a cartridge 26. Thereafter, however, the rod 22 is not retracted any more. At this time, the pawl member 8 is parted away from the first gear wheel 11 with the aid of the guide 19. Thus, the gear wheel assembly 10 is not rotated when the trigger 4 is restored to the original position. Since the gear wheel assembly 10 is always rotated at a constant rate every time the trigger 4 is actuated, a predetermined quantity of viscous material in the cartridge 26 can be injected through the injection hole 29 by repeatedly actuating the trigger 4.

Next, with respect to the embodiment of the dispenser constructed in the aforementioned manner in accordance with the second aspect of the present invention, a procedure of refilling the cartridge with a new viscous material or exchanging the viscous material in the cartridge 26 with other kind of viscous material will be described below.

When the viscous material in the cartridge 26 is completely injected, an actuating portion 17 of the stopper 15 is actuated with an operator's hand to rotate the stopper 15 in the arrow-marked direction as seen in FIG. 5, causing the stopper 15 to be disengaged from the gear wheel assembly 10. Subsequently, the rod 22 is retracted to the original position while a gripping portion 23 at the rearmost end of the rod 22 is grasped with an operator's hand.

The viscous material contained in the cartridge 26 can satisfactorily be injected merely by keeping the injection hole 29 open in the same manner as the preceding embodiment. When it is required that the tack material is more completely injected, it is recommendable that an injection nozzle is additionally attached to the injection hole 29.

According to the second aspect of the present invention, it is possible to inject the viscous material through an injection port 24 by filling it directly in a storing portion without any use of the cartridge 26 and then slidably displacing an extrusion plate 21 disposed at the foremost end of the rod 22 liquidtightly along the inner wall surface of the storing portion 2. However, similar to the first aspect of the present invention, when the cartridge 26 is practically used for the dispenser, it is easy to exchange the viscous material with other kind of viscous material in the same manner as the foregoing embodiment. In this case, another meritorious effect is that there does not arise any necessity for taking account of liquidtightness to be maintained between the inner wall surface of the storing portion 2 and the extrusion plate 21.

A quantity of injection of the viscous material per single actuation of the trigger 4 is determined depending on a diameter of the second gear wheel 12. However, even in case that the second gear 12 is dimensioned to have a smaller diameter in order to reduce a quantity of forward displacement of the rod 22, a diameter of the first gear wheel 11 meshing with the pawl member 8 and the stopper 13 can be determined irrespectively of the quantity of forward displacement of the rod 22. Thus, not only a distance between the support shaft 5 and the pawl member 8 but also a distance between the support shaft 5 and the stopper can be enlarged by designing the first gear wheel 11 with dimensions larger than the second gear wheel 12. Consequently, sufficiently high actuating torque and sufficiently high engaging force to be exerted on the rod 22 can be obtained in accordance with the foregoing embodiment.

In addition, in the foregoing embodiment, since the load to be borne by the dispenser is distributed by meshing the first gear wheel 11 with the pawl member 8 and the stopper 15, and moreover, meshing the second gear wheel 12 with the rack 2, sufficiently high strength and excellent durability can be maintained for the dispenser. It should be noted that the present invention should not be limited only to the aforementioned embodiments but it is possible to modify the dispenser in such a manner that a single gear wheel is substituted for the gear wheel assembly. In this case, the stopper, the stopper and the rod are engaged only with the foregoing gear wheel.

INDUSTRIAL APPLICABILITY

As is apparent from the above description, the dispenser for a viscous material constructed in accordance with the present invention is useful not only as an instrument employable merely for injecting an edible viscous material such as mayonnaise, cream or the like but also as an instrument for injecting the edible viscous material at a constant rate. Especially, the dispenser of the present invention is advantageously employable for an operation of continuously distributing the edible viscous material over a number of cooked dishes at a high efficiency.

I claim:

1. A manual dispenser for injecting a viscous material, comprising a main body and a storing portion attached to the main body, said main body having a trigger disposed therein which is movable from an original position upon actuation of the trigger and which is returnable to the original position upon release of the trigger, a cylindrical inner case disposed in the storing portion, a cartridge molded of flexible synthetic resin disposed in the inner case, said cartridge having an opening formed in a fore end part and having viscous material stored therein which can be dispensed through the opening by actuation of the trigger, an extrusion plate positioned in the inner case for being thrust against a rear end of the cartridge upon actuation of the trigger to dispense viscous material from the cartridge, thrusting means operatively associated with the trigger and connected to the extrusion plate for thrusting the extrusion plate during actuation of the trigger, an engaging member disposed in the trigger which is movable into engagement with the thrusting means during actuation of the trigger to move the thrusting means and which is movable out of engagement with the thrusting means, a stopper positioned in the main body which is adapted to be engaged with the thrusting means to prevent the thrusting means from moving and which is adapted to be disengaged from the thrusting means to permit the thrusting means to move, a guide disposed in the main body for moving the engaging member out of engagement with the thrusting means when the trigger is returned to the original position, said inner case having a first end and an oppositely positioned open second end, said inner case being dimensioned so that a shoulder portion of said cartridge adjacent the fore end part extends beyond the open second end of the inner case, the first end of said inner case being provided with a hole through which extends the thrusting means, the actuation of said trigger causing a portion of said cartridge to be contracted so that viscous material is dispensed through the opening and the release of said trigger causing the contracted portion of the cartridge to be elongated so that viscous material in the opening is drawn into the cartridge.

2. A manual type dispenser for injecting viscous material according to claim 1, wherein said extrusion plate and said thrusting means are removably connected to one another.

3. A manual type dispenser for injecting viscous material according to claim 1, wherein said thrusting means includes a gear wheel assembly and a rack which meshes with the gear wheel assembly, one end of said rack being connected to the extrusion plate.

4. A manual type dispenser for injecting viscous material according to claim 3, wherein said gear wheel assembly includes a first gear wheel and a second gear wheel, the first gear wheel having a diameter that is larger than a diameter of the second gear wheel, said engaging member including a pawl which engages the first gear wheel, and said stopper including a projection for engaging the first gear wheel, said rack being in meshing engagement with the second gear wheel.

5. A manual type dispenser for injecting viscous material according to claim 3, wherein said gear wheel assembly includes a ratchet wheel having a plurality of gear tooth portions, each of the gear tooth portions including two inclined faces, one of the inclined faces of each gear tooth portion being more steeply inclined than the other inclined face.

6. A manual type dispenser for injecting viscous material according to claim 1, including a spring for urging the stopper into engagement with the thrusting means.

7. A manual type dispenser for injecting viscous material according to claim 1, including a spring for urging the engaging member into engagement with the thrusting means.

* * * * *